United States Patent [19]

Podlewski et al.

[11] 3,778,118

[45] Dec. 11, 1973

[54] WHEEL SLIP CONTROL SYSTEM FOR VEHICLES WITH ELECTRIC BRAKES

[75] Inventors: Robert S. Podlewski, Jackson; William T. Birge, Plymouth, both of Mich.

[73] Assignee: Kelsey-Hayes Company, Romulus, Mich.

[22] Filed: Sept. 13, 1971

[21] Appl. No.: 179,858

[52] U.S. Cl............... 303/21 EB, 188/3 R, 303/7, 303/20
[51] Int. Cl.............................................. B60t 8/10
[58] Field of Search................ 188/3 R, 181 C; 303/3, 7, 20, 21; 317/5; 324/160–161; 340/263

[56] References Cited
UNITED STATES PATENTS

| | | | |
|---|---|---|---|
| 3,423,135 | 1/1969 | Beltramo | 303/20 X |
| 3,574,414 | 4/1971 | Jacob | 303/20 X |
| 3,620,577 | 11/1971 | Neisch et al. | 303/21 EB |
| 3,586,385 | 6/1971 | Florus et al. | 303/20 X |
| 3,541,406 | 11/1970 | Etienne | 303/21 BE UX |
| 3,511,542 | 5/1970 | Fielek, Jr. | 303/21 CG |
| 3,520,575 | 7/1970 | Steigerwald | 303/21 BE |
| 3,574,415 | 4/1971 | Stamm | 303/21 EB |

*Primary Examiner*—Milton Buchler
*Assistant Examiner*—Stephen G. Kunin
*Attorney*—Harness, Dickey & Pierce

[57] ABSTRACT

A wheel slip control system for a wheeled vehicle having an electrically operated brake for at least one wheel thereof and an electric brake controller for modulating the actuation of the brake which includes a wheel speed sensor for the wheel, a detector for detecting an incipient excessive slip condition, and means for relieving brake actuation upon the detected occurrence of an incipient excessive slip condition.

3 Claims, 1 Drawing Figure

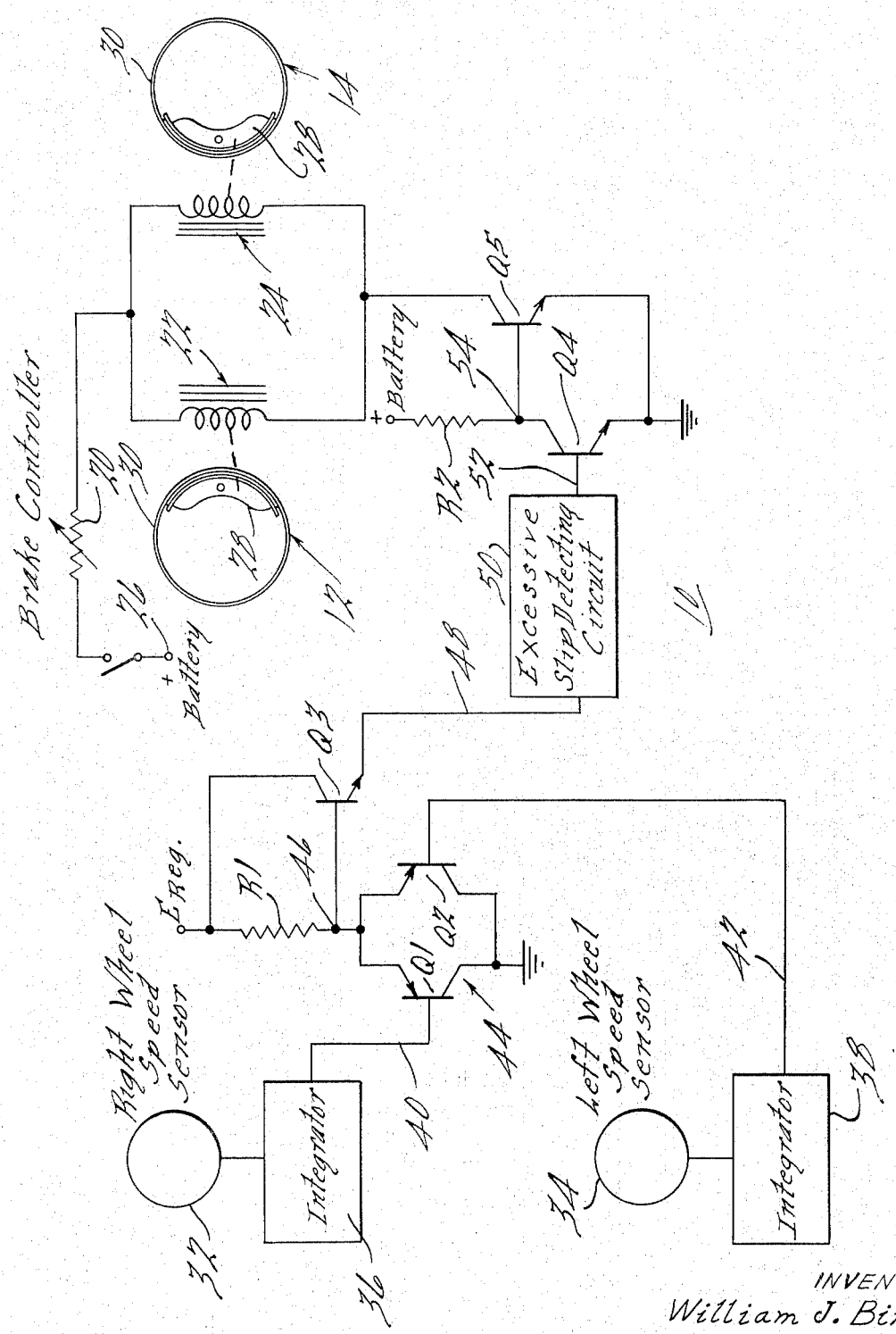

3,778,118

WHEEL SLIP CONTROL SYSTEM FOR VEHICLES WITH ELECTRIC BRAKES

BACKGROUND AND SUMMARY OF THE INVENTION

The present invention relates to a wheel slip control system, and more particularly, to a wheel slip control system for a vehicle having an electric brake such as a trailer or other towed vehicle. Typically, a towed vehicle may have one or more pairs of wheels with an electric brake for each wheel which includes a brake shoe or brake pad which is operated by an electromagnetic device. The electromagnetic device is energized to operate the brakes by a connection to the towing vehicle battery through a brake controller which ordinarily consists of a variable potentiometer located in the towing vehicle. The brake controller is effective to vary the current through the electromagnetic device so as to vary an engaging force between the brake shoe or pad and an opposed friction surface such as a brake drum or disc, respectively.

It will be well appreciated by those skilled in the art that the typical connection between a towing vehicle and a towed vehicle is a single point universal connection which permits a large degree of relative angular movement between the towing vehicle and the towed vehicle. Accordingly, it is important that the towed vehicle be stable during all phases of operation. The stability of a towed vehicle is especially critical during a maximum braking condition since, under some conditions, the wheels of the towed vehicle may lock, and consequently, the towed vehicle may tend to overrun the towing vehicle to create what is commonly referred to as a "jack-knifed" condition.

It is an object of this invention to provide a wheel slip control system for a towed vehicle having electric brakes which augments the stability of the towed vehicle during a braking condition to prevent jack-knifing, or other undesirable motions or forces between the towing vehicle and the towed vehicle. This is accomplished by providing a wheel slip control system for the towed vehicle which senses an incipient excessive slip condition at one or more of the wheels and which is connected to the circuit providing electrical energy to operate the brake actuators in a manner to relieve brake actuation upon the detection of an incipient excessive slip condition, and to reinstate brake actuation after the wheels have spun-up to a controlled slip condition. In its preferred form, the system relieves brake actuation when an incipient excessive slip condition exists at any one wheel and reinstates brake actuation after the last wheel has spun-up to a controlled slip condition.

BRIEF DESCRIPTION OF THE DRAWING

The FIGURE is a schematic illustration of an exemplary wheel slip control system according to the present invention for a vehicle having electrically actuated brakes.

DETAILED DESCRIPTION OF THE PREFERRED EMBODIMENT

In the drawing, a wheel slip control system 10 is shown for a vehicle having electrically actuated brakes 12 and 14. The brakes 12 and 14 are associated with a conventional brake controller 20 and conventional electromagnetic actuators 22 and 24, respectively. The actuators 22 and 24 are connected in parallel so as to equally receive current passing through the brake controller 20 from the positive terminal 26 of the towing vehicle battery. The circuit is completed to ground through a normally-conducting transistor Q5. The actuator 20 is of the variable potentiometer type so that it is effective to vary the level of current delivered to the electromagnetic actuators 22 and 24 by adjustment of the total impedance in the current path. The brake controller 20 may be mounted in the towing vehicle so as to be operated by depression of the towing vehicle brake pedal and/or may be provided with a lever for manual control of the brakes of the towed vehicle.

The brakes 12 and 14 for the towed vehicle may be drum brakes as illustrated or may be disc brakes. In the former type, brake shoes 28 are utilized, each of which carry an electromagnetic coil essentially comprising each of the actuators 22 and 24, and are so designed so as to cause an electromagnetic attraction between the shoes 28 and the brake drums 30 which is effective to establish an engaging force between the friction linings of the brake shoes 28 and the drums 30 which is proportional or related to the current through the actuators 22 and 24. It is important to note that the actuators 22 and 24 are not only electrically controlled in accordance with the level of the current, but are also operated, i.e., powered or motivated, electrically by virtue of the flow of current through the electromagnetic actuators 22 and 24.

In the exemplary system shown in the FIGURE, a right wheel of the towed vehicle is provided with a wheel speed sensor 32 and a left wheel of a towed vehicle is provided a wheel speed sensor 34. The wheel speed sensors 32 and 34 provide a train of pulses, which are numerically related to the angular displacement of the wheel, to integrators 36 and 38, respectively, which integrate the train of pulses from the wheel speed sensors 32 and 34 to provide signals on the integrator output lines 40 and 42 which are representative of the instantaneous speed of the respective wheels. The signals on line 40 and 42 are supplied to a circuit 44 which is responsive to the wheel speed signal having the least magnitude and provides an output signal at terminal 46 which is representative of the wheel speed of the slowest wheel. More specifically, the output signal on line 40 representative of the right wheel speed is delivered to the base of a transistor Q1 to turn on the transistor Q1 and to modulate the output of the transistor Q1 if the signal on line 40 is less than the voltage at the emitter of transistor Q1. Similarly, the signal on line 42 representative speed of the left wheel is delivered to the base of the transistor Q2 to turn on the transistor Q2 and to modulate the output of the transistor Q2 when the signal level falls below the voltage at the emitter of transistor Q2. Assuming now that an excessive slip condition is encountered so that the left wheel first enters into an excessive slip condition so that speed of the left wheel falls below the speed of the right wheel, the left wheel speed signal on line 42 will fall below the potential at the emitter of Q2 so as to turn on the transistor Q2 thereby lowering the potential at the terminal 46 to a magnitude in accordance with the left wheel speed signal on line 42. The potential at the terminal 46 (also the potential at the emitter of transistor Q1) is reduced to a magnitude which is less than the magnitude of the right wheel speed so that the transistor Q1 is maintained in a non-conductive condition. Consequently, the transistor Q2 solely controls the potential at terminal 46. It will be appreciated that the potential at the terminal 46 will be varied in accordance with the instantaneous speed of the excessively slipping left wheel so as to be representative thereof. Conversely, if the right wheel is first to enter an excessive slip condition, the transistor Q1 will control the potential at terminal 46. The signal at line 46 is amplified by an emitter-follow or transistor Q3 to provide an amplified signal on line 48 representative of the speed of the wheel having the slowest wheel speed. The signal on line 48 is received by an excessive slip detecting circuit 50 which detects an incipient excessive slip condition and provides an output signal on line 52 which is delivered to the base of a transistor Q4 to turn on transistor Q4 when an incipient excessive slip condition is detected.

The excessive slip detecting circuit 50 may be of the conventional type such as one which establishes a vehicle velocity analog signal upon application of the brakes and compares the actual speed of the slowest wheel with the vehicle velocity analog signal to determine when excessive slip is encountered. Alternatively, the excessive slip detector 50 may be responsive to a wheel deceleration above a threshold level which is indicative of an incipient excessive slip condition. Other forms and modifications of excessive slip detecting systems may be utilized.

When transistor Q4 is turned on, the base of the normally conducting transistor Q5, which is connected to the collector of transistor Q4 at terminal 54, is lowered to near ground potential so as to turn-off the transistor Q5. When transistor Q5 is non-conductive, the flow path of current from the battery terminal 26 through the brake actuators 22 and 24 is interrupted thereby relieving brake actuation to allow the excessively slipping wheel to spin up.

During spin-up of the excessively slipping wheel after the brake actuation has been relieved, the circuit 44 continues to provide a signal which is representative of the speed of the slowest wheel. So long as the slowest wheel is determined to be in an excessive slip condition by the excessive slip detecting circuit 50, the transistor Q5 will be maintained off so that full braking is not reinstated. Once the slowest wheel has spun up to a sufficient velocity so that a controlled slip condition exists, that condition is detected by the excessive slip detecting circuit 50 which terminates the signal on line 52 so as to turn off the transistor Q4. Consequently, the transistor Q5 is turned on so that full braking, if dictated by the driver, is restored.

In view of the above explanation, it will be appreciated that the system 10 relieves brake actuation during a period which begins when the first wheel approaches an excessive skid condition and ends when the last wheel spins up to a controlled slip condition. That mode of operation provides the maximum stability for the towed vehicle.

While it will be apparent that the teachings herein are well calculated to each one skilled in the art the method of making preferred embodiment of this invention, it will be appreciated that the invention is susceptible to modification, variation and change without departing from the proper scope of meaning of the subjoined claims.

What is claimed is:

1. In combination with a towed vehicle having at least two wheels:
    brake means for said two wheels including at least one electrically operated brake actuator;
    means for providing an electrical signal for operating said electrically operated brake actuator, said means including an electric brake controller for varying said electrical signal to vary brake actuation;
    slip detecting means for detecting the occurrence of an undesirable slip condition at any one of said two wheels and the termination of an undesirable slip condition at both of said two wheels for providing an electrical slip control signal representative thereof; and
    circuit means including a controlled conduction device which is responsive to said electrical slip control signal for controlling said electrically operated brake actuator in a manner to relieve actuation of the braking of both of said two wheels by said brake means upon a detected undesirable slip condition at any one of said two wheels and to reinstate actuation of the braking of both of said two wheels upon the termination of an undesirable slip condition at both of said two wheels, said circuit means interconnecting said electric brake controller, said controlled conduction device and said electrically operated brake actuator in a manner so that each of said electric brake controller and said controlled conduction device is effective to control operation of said electrically operated brake actuator.

2. A combination of claim 1 wherein said electric brake controller controls the degree of actuation of said brake.

3. A combination of claim 2 wherein said electrically operated brake actuator is an electromagnetic actuator.

* * * * *